United States Patent [19]

Scotto

[11] Patent Number: 4,582,239
[45] Date of Patent: Apr. 15, 1986

[54] ULTRASONIC WELDING TOOLS
[75] Inventor: Jean-Pierre Scotto, Bonne, France
[73] Assignee: Mecasonic, Annemasse, France
[21] Appl. No.: 582,792
[22] Filed: Feb. 23, 1984
[30] Foreign Application Priority Data Feb. 23, 1983 [FR] France .................. 83 02915

[51] Int. Cl.$^4$ .............................. B23K 5/20
[52] U.S. Cl. ................................ 228/1.1; 156/580.2
[58] Field of Search .............. 228/1.1; 156/580.1, 156/580.2

[56] References Cited

U.S. PATENT DOCUMENTS

| 3,212,313 | 10/1965 | Boyd et al. ........... | 228/1.1 X |
| 3,378,429 | 4/1968 | Obeda ................. | 156/580.2 X |
| 3,419,447 | 12/1968 | Hewitt ................ | 228/1.1 X |
| 3,780,926 | 12/1973 | Davis ................. | 228/1.1 |
| 3,821,048 | 6/1974 | Acker et al. ......... | 156/580.1 X |

FOREIGN PATENT DOCUMENTS 3032241 4/1982 Fed. Rep. of Germany .
2224992 10/1974 France .

Primary Examiner—Robert P. Olszewski
Attorney, Agent, or Firm—Wenderoth, Lind & Ponack

[57] ABSTRACT

A compound sonotrode for an ultrasonic welding tool includes a carrier block or adaptor mounted on an ultrasonic machine, and secondary sonotrodes or concentrators fixed to the carrier block by pins tuned to the resonance frequency of the assembly, so as not to disturb the vibratory mode of operation of the compound sonotrode.

3 Claims, 5 Drawing Figures

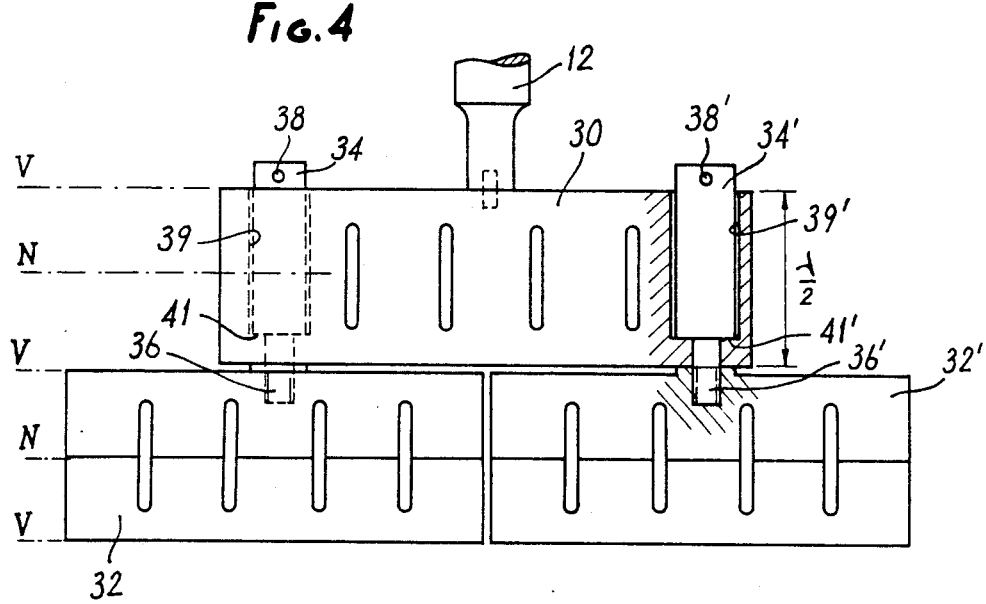
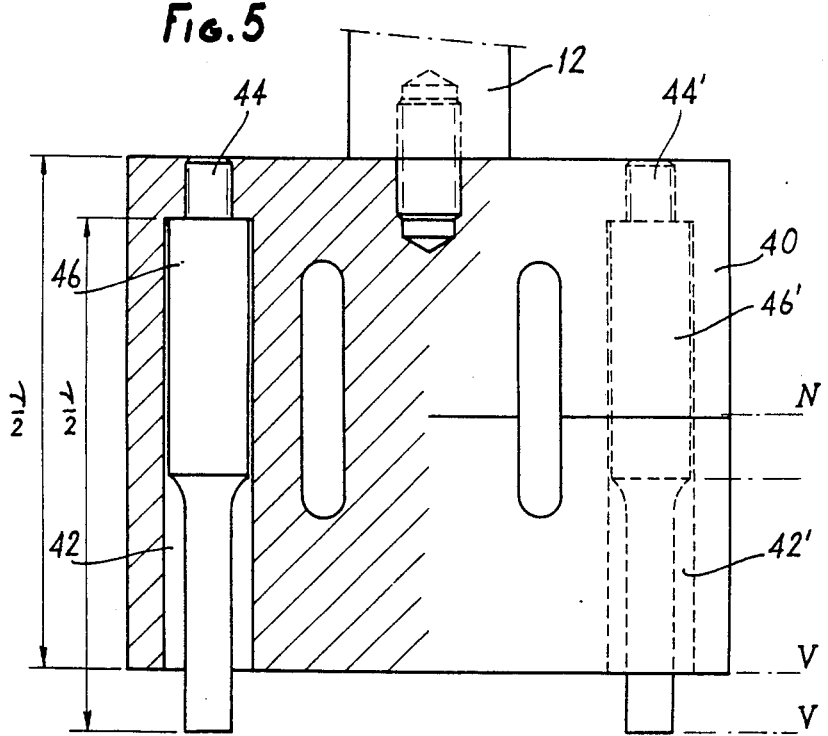

ULTRASONIC WELDING TOOLS

FIELD OF THE INVENTION

The present invention relates to ultrasonic welding tools, and it concerns more particularly improvements to so-called compound sonotrodes.

BACKGROUND OF THE INVENTION

Such compound sonotrodes have been described in particular in U.S. Pat. No. 28 642 issued to Dukane Corporation, and in French Patent No. 73 12 673 assigned to the assignee of the present application. In FIG. 1 of the accompanying drawings is shown an embodiment of a compound sonotrode of the prior art.

Such compound sonotrode is composed substantially of a carrier block 10, tuned to the half-wavelength of the nominal frequency of an ultrasonic transmitter or transducer 12 (the frequencies generally selected being of the order of 20 to 40 Hz), a plurality of sonotrodes or concentrators 14, cut off to the half-wavelength at the same frequency as block 10, and pins 16 for the fixation of the concentrators 14 to the carrier block 10.

The assembly thus formed provides a system in two half-wavelengths. In FIG. 1, the amplitude loops have been denoted by reference V, and the amplitude nodes, or stress loops, have been denoted by reference N. Such a known system of compound sonotrodes allows notably concentration of energy on the active area of the sonotrodes 14, determined according to welding areas to be formed on an article to be assembled.

Such a known system has the disadvantage of being only applicable in the case where it is possible to screw the sonotrodes or concentrators 14, onto the carrier block 10 via pins 16, thereby making impossible a compound sonotrode comprising two adjacent rectangular blocks mounted on the same block or adaptor 10, since one cannot screw the two rectangular blocks in order to fix them on an adaptor 10.

In order to remedy the disadvantages of this known solution, it has been envisaged to provide compound sonotrodes comprising concentrators of rectangular shape, mounted side by side. This solution, which also is within the prior art, is been shown in FIGS. 2 and 3 of the accompanying drawings.

One sees that the compound sonotrode of this type if comprised of a supporting block 18 cut off to the half-wavelength, at least two concentrators 20, 20' having the shape of rectangular blocks and arranged side by side in positions preventing any rotation about fixation means, and fixation pins 22, 22'. As is shown in FIG. 3, each fixation pin 22 (or 22') comprises on one side a right-hand thread 24, on the other side a left-hand thread 26, and an intermediate portion 28 of hexagonal shape for rotation to thread the concentrator blocks 20, 20' toward and onto the carrier block 18.

With this solution, it is actually possible to set in vibration several concentrator blocks, such as 20, 20', on the same adaptor block 18, but under the prerequisite that the fixation pins 22, 22' do not disturb the vibratory mode of operation of the thus formed compound sonotrode. But experience shows that the weight of the fixation pins such as 22, 22' introduces disturbances in the vibratory mode of operation of such compound sonotrodes, and that the pins inevitably break after a certain period of operation. This disadvantage, which is foreseeable, is due to the fact that each fixation pin forms a significant and not tuned mass, subjected to intensive vibrations since it is located in the area of maximum amplitude, and that such mass under no circumstances can tune in to the vibratory system formed by the compound sonotrode.

Therefore, such a known technique does not allow obtaining compound sonotrodes adapted for working according to the half-wavelength theoretical mode of operation, since the presence of the significant mass formed by the fixation pin, or amplitude loop V of the resonant system, seriously disturbs the resonance mode of operation and introduces side stresses at the level of the fixation of the pins, where precisely there should be the minimum of stresses.

OBJECTS AND SUMMARY OF THE INVENTION

The object of the present invention is to provide a compound sonotrode which does not exhibit the disadvantages of the hereabove prior art solutions.

To this effect, there is provided according to this invention a compound sonotrode of the type comprising an adaptor block mounted on the transmitter of an ultrasonic machine, and sonotrodes fixed to the block via pins which are tuned to the resonance frequency of the assembly, so as not to disturb the vibratory mode of operation of the compound sonotrode.

According to a first embodiment of the invention, the compound sonotrode comprises an adaptor block having a length equal to a half-wavelength of the operating frequency, two or more concentrators or tools in the shape of rectangular blocks each having a length equal to such half-wavelength, and fixation pins also having lengths equal to such half-wavelength, and rigidly fixing the concentrator blocks to the adaptor block.

According to a second embodiment of the invention, the compound sonotrode is formed of an adaptor block comprising housings in which are fixed the concentrators, having lengths equal to the half-wavelength, at the level of the amplitude loop. In this alternative, the tuned pins are therefore used as concentrators, that is as secondary sonotrodes.

BRIEF DESCRIPTION OF THE DRAWINGS

Other features and advantages of the invention will become more apparent from the following description, with reference to the accompanying drawings which illustrate embodiments thereof and which have no limiting character effect on the scope thereof.

In the drawings:

FIG. 4 is a side elevation schematic view of a first embodiment of a sonotrode according to the invention; and FIG. 5 is a side elevation view, also schematic, of a second embodiment of the invention.

DETAILED DESCRIPTION OF THE INVENTION

Figure 1:
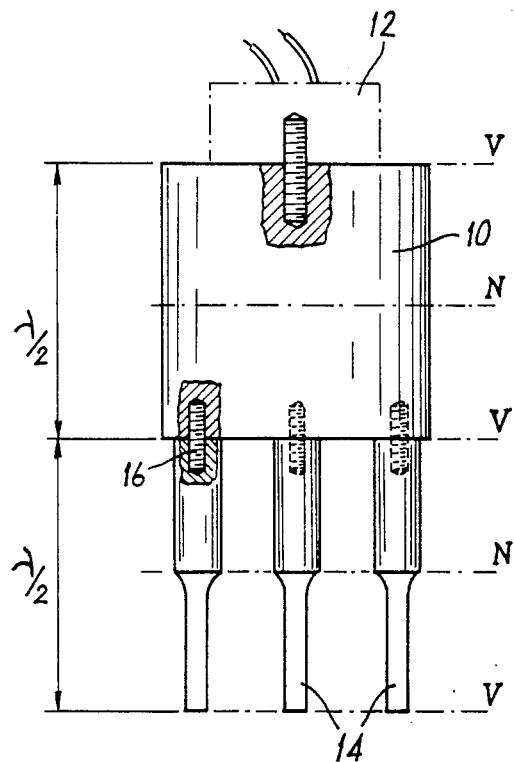
FIG. 1 is a side elevation, partially broken away, of a first embodiment of a compound sonotrode according to the hereabove described known art.
Figure 3:
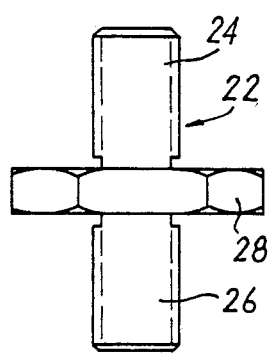
FIG. 3 is a view at a larger scale showing the fixation screw used in the sonotrode of FIG. 2.
Figure 2:
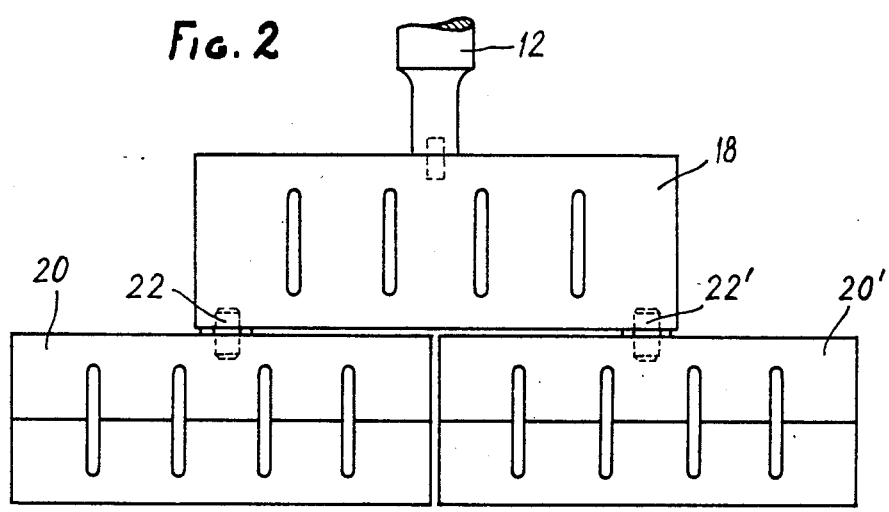
FIG. 2 is a side elevation schematic view of the second embodiment of the compound sonotrode according to the hereabove described prior art technique.

Reference is first made to FIG. 4. This embodiment of a compound sonotrode according to the invention, includes carrier block 30, having a length equal to a half-wavelength at the operating frequency and mounted on transmitter 12 of an ultrasonic machine, and sonotrodes 32, 32', provided in the form of rectangular blocks each having a length equal to such half-wavelength and placed side by side. According to the invention, the sonotrode or concentrator blocks 32, 32' are fixed to the carrier block 30 via pins, tuned to the resonance frequency of the assembly. As may be seen in FIG. 4, each of the tuned pins (replacing therefore the fixation pins 22, 22' of the prior art solution shown in FIGS. 2 and 3), comprises a body or portion 34, 34' having a length equal to the half-wavelength, one end of which has a threaded portion 36, 36', respectively, for the fixation of the secondary sonotrode blocks or concentrators 32, 32', respectively. Carrier block 30 has drilled therein bores 39, 39', parallel to the axis of block 30, and each having a supporting end or shoulder 41, 41' respectively, adjacent the block amplitude loop V. Rotation of the pins, e.g. by tools extending into clamping holes 38, 38') threads portions 36, 36' into respective threaded holes in sonotrodes 32, 32', thus achieving attachment thereof to block 30.

In this compound sonotrode, portions 34, 34', tuned to the resonance frequency of the assembly, have lengths equal to the half-wavelength, and they exhibit an amplitude loop V at each end, and a vibration node N, located substantially in the middle. To this vibration node N corresponds a stress loop.

It will be noted that all the elements constituent of the compound sonotrode according to this invention (support block 30, portions 34, 34', and concentrator blocks 32, 32') have respective lengths equal to the half-wavelength. The only stress loops which appear are located substantially at the middle of each element. Thus, there is provided an assembly which is perfectly tuned, and which does not have secondary stresses at the level of fixation, that is at the level of the threaded portions 36, 36' of the fixation pins. Due to the invention, the secondary stress loops which, in the prior art solution shown in FIG. 2, were present at the level of the amplitude loop separating blocks 18 and 20, 20' have been displaced to the median area of the portions 34, 34', that is to a location where they have to normally exist. According to the invention, there is therefore provided a fixation system for the secondary sonotrodes 32, 32' which does not disturb the vibratory mode of operation of the compound sonotrode, the essential feature of this invention consisting in replacing the inert pins of the prior art, whose function is purely mechanical, with pins tuned to the resonance frequency of the assembly of the compound sonotrode.

The embodiment hereabove described permits making compound sonotrodes having a total length equal to two half-wavelengths, that is about 240 mm, if one considers a compound sonotrode of duralumin, vibrating at a frequency of 20 kHz.

The alternative embodiment of the invention shown in FIG. 5 provides a compound sonotrode having a length which hardly exceeds the half-wavelength, of the material in consideration.

In FIG. 5, the compound sonotrode comprises a carrier block 40, of rectangular shape, mounted on the transmitter 12, and defining internal housings 42 42', designed to receive sonotrodes or concentrators 46, 46', at the level of the primary amplitude loop.

Each concentrator 46, 46' is formed of a body having a length equal to the half-wavelength and of one threaded end 44, 44' providing for fixation to the carrier block 40.

In this alternative, the tuned pins are used as concentrators, with the advantage that the active surface of the concentrators 46, 46' protrudes from the carrier block 40 by a few millimiters only.

Obviously, this invention is not limited to the embodiments shown and described herein, but rather compasses all alternatives thereof.

What I claim is:

1. A compound sonotrode assembly for use as an ultrasonic welding tool, said assembly comprising:
   an ultrasonic generator having an operating frequency;
   a carrier block fixed at one end thereof to said generator to receive vibrations therefrom, said carrier block having a length between said one end and an opposite end equal to a half wavelength at said operating frequency;
   plural sonotrodes fixed to said opposite end of said carrier block to receive therefrom vibrations, each said sonotrode having a length equal to a half wavelength at said operating frequency; and
   fixing means for rigidly fixing said sonotrodes to said carrier block without interfering with the transmission of vibrations from said carrier block to said sonotrodes, said fixing means comprising plural pins fixing respective said sonotrodes to said carrier block, each said pin having a first portion rigidly fixing a respective said sonotrode to said carrier block and a second portion extending freely vibratably from said first portion, said second portion having a length equal to a half wavelength at said operating frequency and thereby being tuned to the resonance frequency of said assembly.

2. An assembly as claimed in claim 1, wherein said carrier block has therein plural stepped bores, each said bore including a larger bore portion opening at said one end of said carrier block and a smaller bore portion opening at said opposite end of said carrier block, said larger and smaller bore portions defining a step positioned adjacent said opposite end of said carrier block, said first portion of each said pin extending through said smaller bore portion of a respective said bore and being threaded into a respective said sonotrode, and said second portion of each said pin abutting a respective said step and extending therefrom through said larger bore portion of said respective bore.

3. A compound sonotrode assembly for use as an ultrasonic welding tool, said assembly comprising:
   an ultrasonic generator having an operating frequency;
   a carrier block fixed at one end thereof to said generator to receive vibrations therefrom, said carrier block having a length between said one end and an opposite end equal to a half wavelength at said operating frequency, said carrier block having formed therein plural internal housings opening at said opposite end;
   plural sonotrodes positioned within respective said internal housings, each said sonotrode including a first pin portion fixed to said carrier block at an inner end of a respective said internal housing and a second concentrator portion extending freely vibratably from said first pin portion through said respective internal housing, said second concentrator portion having a length equal to a half wavelength at said operating frequency and thereby being tuned to the resonance frequency of said assembly.

* * * * *